United States Patent
Saito et al.

(10) Patent No.: US 6,615,030 B1
(45) Date of Patent: Sep. 2, 2003

(54) MOBILE COMMUNICATIONS SYSTEM AND RADIO BASE STATION APPARATUS

(75) Inventors: Joichi Saito, Yokohama (JP); Naruhito Nakahara, Yokohama (JP); Yuuji Ishida, Fujisawa (JP); Naoki Tsubaki, Yokohama (JP); Toshinori Suzuki, Tokyo (JP); Yoshio Takeuchi, Omiya (JP); Sumaru Niida, Iruma (JP)

(73) Assignees: Hitachi, Ltd., Tokyo (JP); DDI Corporation, Tokyo (JP)

( * ) Notice: Subject to any disclaimer, the term of this patent is extended or adjusted under 35 U.S.C. 154(b) by 451 days.

(21) Appl. No.: 09/656,139

(22) Filed: Sep. 6, 2000

(30) Foreign Application Priority Data

Feb. 9, 2000 (JP) ........................................ 2000-032343

(51) Int. Cl.[7] ................................................ H04B 1/10
(52) U.S. Cl. ........................ 455/296; 455/561; 375/349
(58) Field of Search ................................ 455/560, 561, 455/295, 296, 278.1, 279.1; 375/345, 346, 349

(56) References Cited

U.S. PATENT DOCUMENTS

| 5,289,464 | A | * | 2/1994 | Wang | 370/69.1 |
| 5,978,413 | A | * | 11/1999 | Bender | 375/206 |
| 6,002,727 | A | * | 12/1999 | Uesugi | 375/346 |
| 6,128,486 | A | * | 10/2000 | Keskitalo et al. | 455/422 |

FOREIGN PATENT DOCUMENTS

| JP | 1051353 | 2/1998 |
| JP | 10190494 | 7/1998 |

* cited by examiner

Primary Examiner—Thanh Cong Le
Assistant Examiner—Tuan Tran
(74) Attorney, Agent, or Firm—Antonelli, Terry, Stout & Kraus, LLP

(57) ABSTRACT

In order to prevent decrease of channel efficiency and to effectuate high quality communication while moderating increase of apparatus scale of an interference canceler part and cutting down costs, in a mobile communication and radio base station apparatus according to the present invention, an interference cancel processing part within the base station apparatus is provided with reverse spread processing/respread processing parts for performing reverse spread processing and respread processing on received signals, synthesizing processing parts for synthesizing signals that have been subjected to the respread processing, and subtraction processing parts for subtracting the synthesized signal from received signal, in multiple stages. The interference cancel processing part processes received signals of users #1–#k. As a demodulation processing part, there is provided n demodulation processing parts that perform demodulation processing for received signals of users #1–#n, the number of those users being larger than the number of the users that can be processed in the interference cancel processing part. Those demodulation processing parts perform demodulation processing with respect to signals that have been subjected to the interference cancel processing.

14 Claims, 11 Drawing Sheets

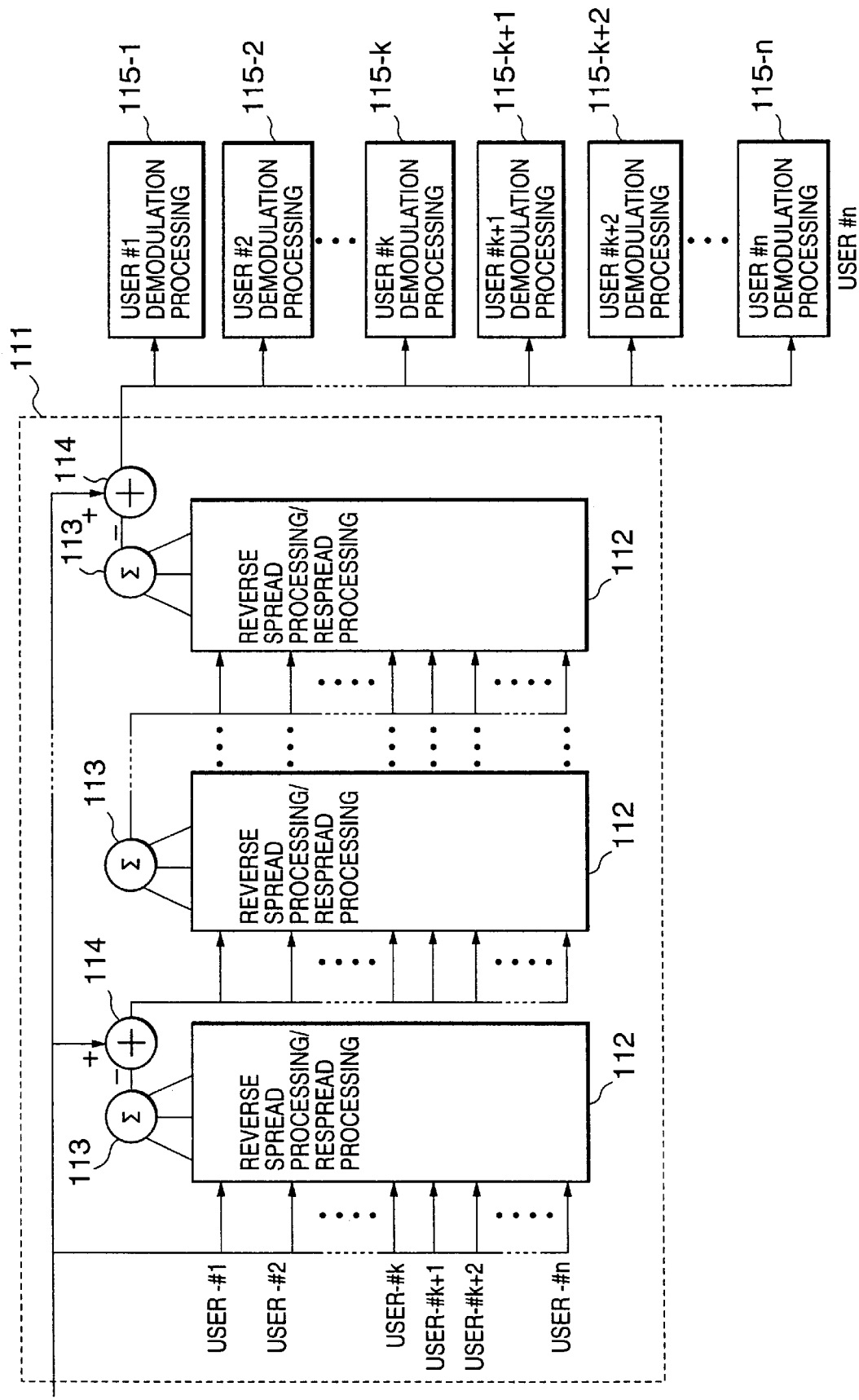

MOBILE COMMUNICATIONS SYSTEM AND RADIO BASE STATION APPARATUS

This application claims a priority based on Japanese Patent Application No. 2000-032343 filed on Feb. 9, 2000, the entire contents of which are incorporated herein by reference for all purposes.

BACKGROUND OF THE INVENTION

The present invention relates to a mobile communication system and a radio base station apparatus, in which communication with a plurality of radio mobile station apparatuses is carried out using the code division multiple access method, and, in particular, relates to a mobile communication system and a radio base station apparatus, in which interference noise components contained in a target demodulation signal due to signals of other radio mobile station apparatuses are subject to suppression processing to obtain a signal that has been subjected to demodulation processing and that signal is transmitted toward a wired transmission path, thereby improving channel usage efficiency.

A wireless communication system using the code division multiple access method possesses suitable characteristics for mobile communication, such as resistiveness to mutual interference with another system, resistiveness to multi-path, easiness of hand-off, superiority in privacy protection, and the like. However, differently from other multiple access methods, in the communication system using the code division multiple access method, a plurality of users existing within a same base station cell carry out communication using a same frequency and a same frequency band at the same time, and accordingly, the system also has a problem of channel usage efficiency. This problem is caused as follows. Namely, interference is generated when, in the presence of the near-and-far problem, a strong signal of a user closer to a base station covers other weak communication signals. Or, interference by other stations is caused by unnecessary transmission power of a certain station itself. Such interference brings decrease of channel usage efficiency.

Countermeasures against decrease of channel usage efficiency include utilization of broad-band gain obtained by using broad-band signal transmission, use of a code series having low cross-correlation, adoption of power control for solving the near-and-far problem, and the like. In particular, power control not only suppresses unnecessary transmission power of a certain station itself leading its transmission power to the necessity minimum so as to suppressing interference by other stations to the minimum, but also is effective for solving the near-and-far problem.

However, even if these countermeasures are employed, it is difficult to prevent degradation of communication quality that accompanies increase of cross-correlation interference (degradation of signal-to-noise ratio) caused by increase of the number of users carrying out simultaneous communication.

As a measure for solving the above-mentioned problem, effective is an interference cancel technique that removes interference generated by other channels, and various types of interference cancel techniques have been examined. Interference by another user can be estimated in a receiver, and it is possible to perform processing for removing the interference. Among these interference cancel methods, there has been proposed a multi-user receiving method utilizing information on a plurality of user signals that are objects of demodulation. An interference cancel apparatus utilizing this method performs demodulation processing for a plurality of user signals that are objects of demodulation, performing respread processing and synthesizing processing on the demodulated signal to generate a replica signal, subtraction processing with the received multi-wave signal to perform demodulation processing, so as to suppress the interference components. Here, the interference cancel processing is performed in a cascaded multi-stage configuration, so that the interference component suppressing effect is increased.

FIG. 11 is a block diagram showing a configuration of an interference canceler unit according to the conventional technique. In the following, the conventional technique will be described referring to the drawing. In FIG. 11, the reference numeral 111 refers to an interference cancel processing part, 112 to a reverse spread processing/respread processing part, 113 to a synthesizing processing part, 114 to a subtraction processing part, and 115-1–115-n to demodulation processing parts.

As shown in FIG. 11, the interference canceler unit according to the conventional technique comprises: the interference cancel processing part 111 for performing interference cancel processing on a multi-wave signal into which a plurality of received spread spectrum signals are synthesized; and a plurality of demodulation processing parts 115-1–115-n for performing demodulation processing such as correlating detection and synchronous detection on the signal subjected to the interference cancellation. The interference cancel processing part 111 comprises: a plurality of reverse spread processing/respread processing parts 112 for performing reverse spread processing and respread processing on a received signal; synthesizing processing parts 113 for synthesizing signals subjected to the respread processing; and subtraction processing parts 114 for subtracting the synthesized signal from received signal. The interference cancel processing part 111 is constructed such that the processing by those processing parts is repeated in a plurality of stages. The interference cancel processing part 111 can process received signals of users #1–#n, and the demodulation processing parts 115-1–115-n perform the demodulation processing on the received signals of the users #1–#n, respectively.

Since the interference canceler unit according to the conventional technique has the above-described structure, the scale of the interference canceler unit and the quantity of processed signals become enormous. Further, in the case of a radio base station apparatus that should receive many users, the scale of the apparatus becomes unrealistically large when it is to be constructed to include an interference canceler unit that performs the interference cancel processing for all user signals.

As known information on this type of interference cancel, may be mentioned, for example, Japanese Non-examined Patent Laid-Open Nos. 10-51353, 10-190494, etc.

SUMMARY OF THE INVENTION

A mobile communication system using the above-described code division multiple access can not help increase of cross-correlation interference due to increase of the number of users in communication at the same time. Thus, interference cancel technique is indispensable. Among the interference cancel methods, the interference canceler method of multi-user receiving type utilizes information on a plurality of user signals that are objects of demodulation, and thus, requires a signal processing part including a plurality of correlators and respread circuits for suppressing cross-correlation interference components. This signal processing part for suppressing the cross-correlation interference components is constructed in multiple stages so as to improve the effect of suppressing the cross-correlation interference components, and accordingly, the scale of the apparatus becomes large. Further, the interference canceler system of the multi-user receiving type performs signal processing utilizing the user signals that are objects of demodulation. Accordingly, it is necessary to suitably manage and control each of the received signals. As a result, a communication system using thus-mentioned interference cancel method has such a problem that it becomes large in the scale of a base station apparatus and in the scale of signal processing, thus increasing costs.

An object of the present invention is to solve such problem in a mobile communication system using the above-mentioned code division multiple access method that the apparatus scale becomes larger as the number of received users becomes larger, in developing an interference cancel part for preventing decrease of channel efficiency owing to cross-correlation interference generated by increase of the number of communicating users. Further, another object of the present invention is to provide a mobile communication system and a radio base station apparatus that can effectuate high quality communication and prevent decrease in channel efficiency while moderating increase of the apparatus scale of the interference canceler part, and decreasing the apparatus scale of a radio base station apparatus and costs.

According to the present invention, the above-mentioned objects are attained by a mobile communication system provided with a radio base station apparatus communicating with radio mobile station apparatuses and a radio base station apparatus, wherein:

said radio base station apparatus comprises:
    a signal processing means that receives a multi-wave signal as an input signal, into which spectrum spread codes from a plurality of radio mobile station apparatuses are synthesized, and that performs suppression processing for suppressing interference noise components other than a desired wave in demodulation of a target signal; and
    a demodulation processing means for performing demodulation processing on spread signals that have been subjected to the suppression processing with respect to the interference noise components;
    a number of user signals on which said signal processing means can perform signal processing is smaller than a number of user signals that have been subjected to said suppression processing for suppressing the noise components and that can be demodulated by said demodulation processing means; and
    said signal processing means that suppresses the interference noise components selects a part of the user signals, and uses said selected part of the user signals to suppress the interference noise components.

In the above-described reception synchronous processing, as a method of selecting user signals that are to be subjected to reception processing in an interference canceler part of a receiving part of the radio base station apparatus, the methods described in the following may be used.

One method of selecting user signals that are to be subjected to the reception processing utilizes processing results of control channel communication processing that is performed at the time of registering a position of mobile station or at the time of starting to speak, decides allotment of user signals that are to be subjected to the interference cancel processing based on the result of the control channel communication processing, and delivers information required for starting the reception processing based on the result of allotment decision. In the code division multiple access radio communication system, transmission rates of signals used in communication are different between voice communication, data communication, etc. However, by multiplying spread signals of different spread ratios respectively, spread signals of a constant rate are generated. The spread signals are subjected to reverse spread processing on the receiving side. Since power control of signals is performed in a state of the spread signals, signal power including reverse spread gain after the reverse spread is different depending on the spread ratio. The fact that signal power differs depending on the spread ratio is noted and utilized to specify that a voice signal having a large reverse spread gain is not subjected to the interference cancel processing but to demodulation processing only, and a signal having a small reverse spread gain such as data communication is subjected to the interference cancel processing, for example.

Another method of selecting user signals that are to be subjected to the reception processing utilizes results of controlling an antenna apparatus that uses dynamically changeable directivity and gain of an antenna such as a smart antenna and array antenna to select target user signals that are to be subjected to the reception processing and user signals that are not targets, in order to select user signals that are to be subjected to the interference cancel processing. Namely, the antenna apparatus that utilizes directivity and gain of an antenna such as a smart antenna and array antenna to select user signals that are to be subjected to reception processing can select and distinguish individual user signals when communicating users are positioned in different directions from each other. On the other hand, when the user are positioned in the same direction although their distances are different, it is impossible to select and distinguish received user signals. Accordingly, the interference cancel processing is preferentially performed on those user signals, and information required for starting reception is delivered to the reception synchronous processing part.

Still another method of selecting user signals that are to be subjected to the reception processing utilizes results of path detection and switches selection circuits provided in the subsequent stage to the reception synchronous processing part, so as to perform signal allotting processing. Reception synchronous processing parts for respective received signals in the interference cancel part of the present invention perform synchronous processing and path detection processing on the received signals. In the path detection processing, delay profiles of radio transmission paths owing to convolution of the received signals are measured to detect a plurality of paths that is to be received by an RAKE synthesis part. The reception synchronous processing parts receive a reception start instruction once and deliver the results of the synchronous processing and the path detection to the control part. The control part switches selection circuits provided in the subsequent stage to the reception synchronous processing parts in order to perform the interference cancel processing preferentially with respect to mobile stations having large average peak power. This control is effective when a user signal has a difference in the average power level in comparison with other communication signals, even if power control is performed, such as in the case that the communicating user signal is extremely close or conversely distant.

Still another method of selecting user signals that are to be subjected to the reception processing utilizes the above-described methods in combination. Namely, the control part utilizes the results of control channel communication processing that is performed at the time of registering a position of mobile station or at the time of starting to speak and control information on dynamically changeable directivity and gain of an antenna such as a smart antenna and array antenna, in order to decide allotment of user signals as targets of the reception processing and non-target user signals. This allotment is delivered to the reception synchronous processing parts as information required for starting reception. Further, with respect to the user signals that have been once allotted, the control part utilizes results of the path detection in the reception synchronous processing parts that performed the synchronous processing and the path detection processing, in order to switch the selection circuits provided in the subsequent stage to the reception synchronous processing parts, thus performing signal switching processing.

BRIEF DESCRIPTION OF THE DRAWINGS

FIG. 11 is a block diagram showing a configuration of the interference canceler unit according to the conventional technique.

DESCRIPTION OF THE PREFERRED EMBODIMENTS

Figure 1:
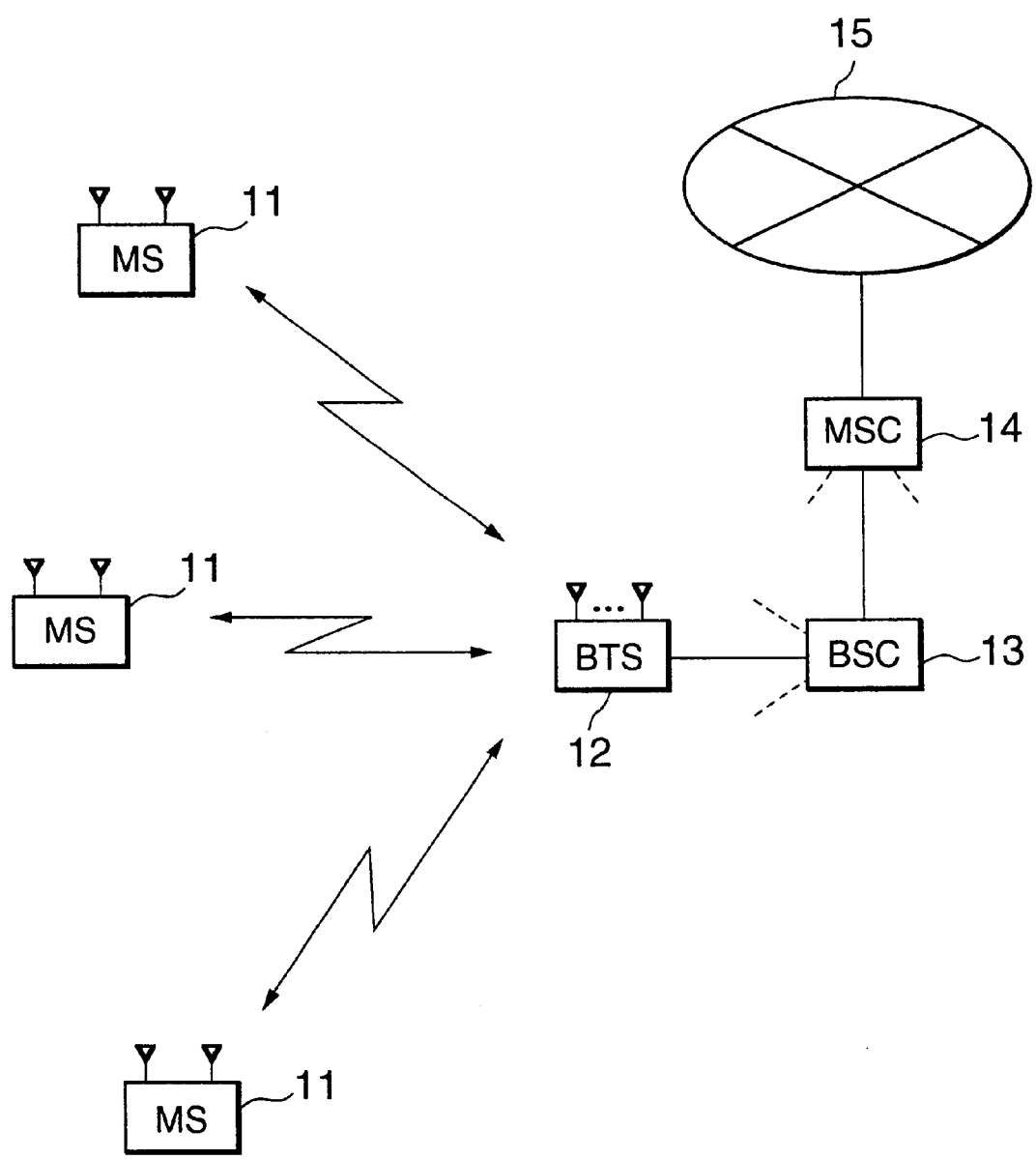
FIG. 1 is a block diagram showing a configuration of a communication system utilizing code division multiple access method, according to one embodiment of the present invention.

In the following, embodiments of the mobile communication system and radio base station apparatus according to the present invention will be described in detail referring to the drawings.

Figure 2:
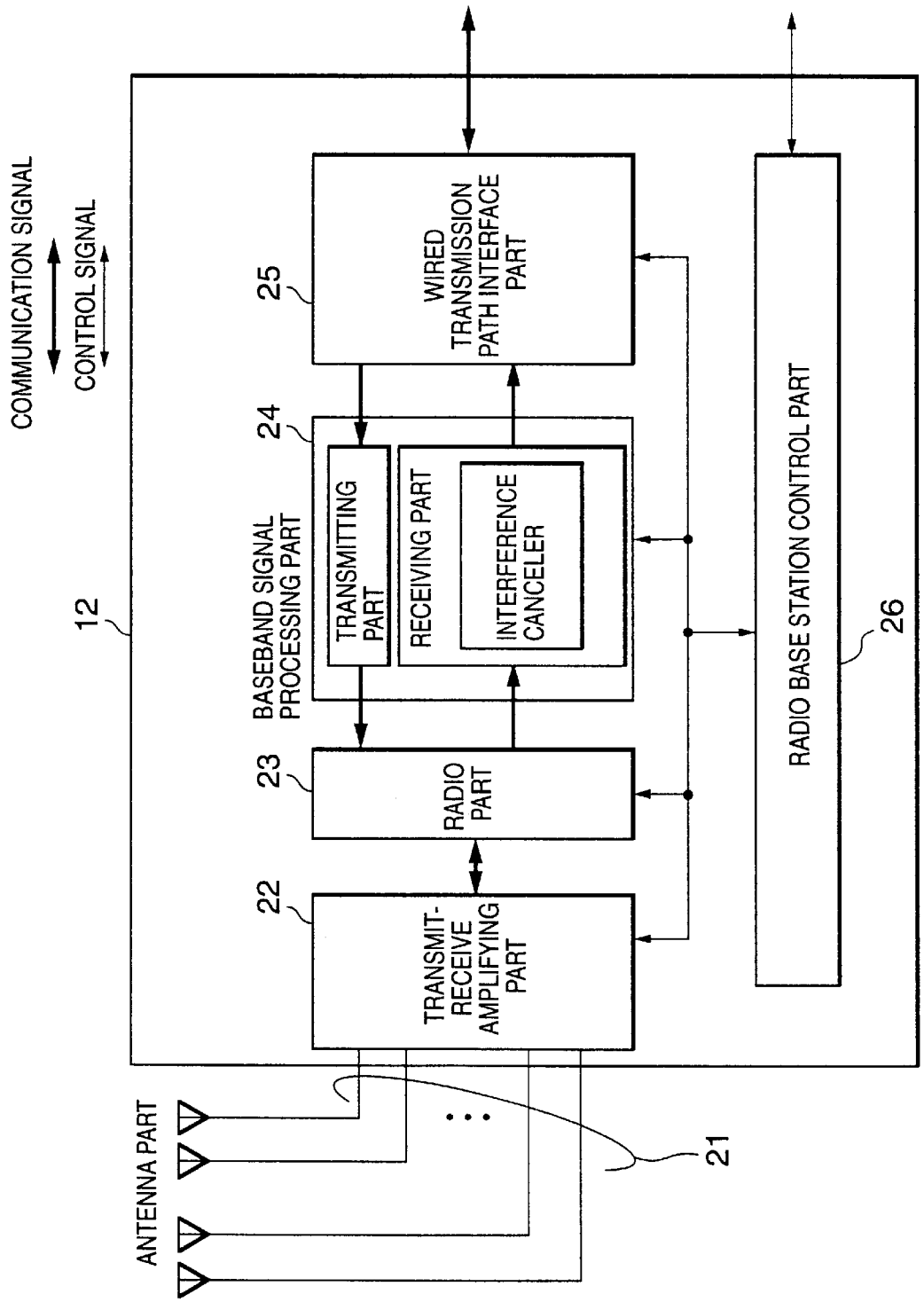
FIG. 2 is a block diagram showing a configuration of a radio base station apparatus including an interference canceler unit.

FIG. 1 is a block diagram showing a configuration of a communication system utilizing code division multiple access method, according to one embodiment of the present invention, and FIG. 2 is a block diagram showing a configuration of a radio base station apparatus including an interference canceler unit. First, configurations of the communication system and radio base station according to the present embodiment of the invention will be described in outline. In FIGS. 1 and 2, the reference numeral 11 refers to a radio mobile station apparatus (MS), 12 to a radio base station apparatus (BTS), 13 to a radio control part (BSC), 14 to an switching control part (MSC), 15 to a public telecommunication network, 21 to an antenna part, 22 to a transmit-receive amplifying part, 23 to a radio part, 24 to a baseband processing part, 25 to a wired transmission path interface part, and 26 to a radio base station control part.

As shown in FIG. 1, the mobile communication system to which the present invention is applied comprises the radio mobile station apparatus 11, the radio base station apparatus 12 that uses the code division multiple access method for effectuating communication with a plurality of radio mobile station apparatuses 11, the radio control part 13 that is connected to a plurality of radio base station apparatus and performs selective synthesizing processing and distribution processing on communication signals and control signals and performs diversity handover processing for the radio mobile station apparatuses 11, and the switching control part 14 that is connected to a plurality of radio control parts 13 and other communication apparatuses and performs switching processing for communication signals. This mobile communication system is connected to the public telecommunication network 15.

The radio mobile station apparatuses 11 and the radio base station apparatus 12 employ the code division multiple access method as their communication system to effectuate communication with a plurality of mobile station users within the radio service area of the radio base station apparatus 12, using the same frequency and the same frequency band. Individual communications are separated from one another by using different codes respectively. Further, in order to solve the near-and-far problem generated when a strong communication signal of a mobile station user closer to the radio base station apparatus 12 covers a weak communication signal of another mobile station user, processing such as power control is carried out.

The radio control part 13 is connected to a plurality of radio base station apparatuses 12, and performs the selective synthesizing processing of communication signals and control signals from respective radio base station apparatuses 12 and performs the distribution processing of communication signals and control signals to respective radio base station apparatuses 12. Further, with respect to those communications, the radio control part 13 also performs the diversity handover processing for switching communication signals between the radio base station apparatuses when a radio mobile station 11 moves from a radio service area covered by one radio base station apparatus 12 to a radio service area covered by another radio base station apparatus.

As shown in FIG. 2, the radio base station apparatus 12 comprises the antenna part 21, the transmit-receive amplifying part 22, the radio part 23, the baseband signal processing part 24, the wired transmission path interface part 25, and the radio base station control part 26.

The antenna part 21 that sends and receives radio signals has two systems of transmitting and receiving antennas for each communication area, in order to effectuate diversity reception, and, when the base station apparatus is a radio base station adapted for multiple-sector processing, the antenna part is provided with a plurality of antennas corresponding to the number of sectors.

The transmit-receive amplifying part 22 is provided with a transmitting amplifier for amplifying a radio signal to be transmitted and a low-noise amplifier for amplifying a received radio signal, and performs division multiplexing of a radio signal to be transmitted and a radio signal received.

The radio part 23 comprises: a radio transmitting part that performs D/A conversion on a transmission signal, which has been subjected to the baseband signal processing, and converts it to a radio-frequency signal after quadrature modulation, to send it to the transmitting amplifier of the transmit-receive amplifying part 22; and a radio receiving part that converts a signal received from the receiving amplifier of the transmit-receive amplifying part 22 to a baseband-signal frequency and performs A/D conversion after semi-synchronous detection, to transmit it to the baseband signal processing part 24.

The baseband signal processing part 24 comprises: a baseband transmitting part that performs signal processing such as error correction coding, framing, data modulation, spread modulation, etc. on transmission data; and a baseband receiving part that has an interference canceler unit and performs signal processing such as reception synchronization, reverse spread, interference suppressing processing, error correction decoding, multiplexing and separation of data, maximum ratio synthesizing at the time of diversity handover, etc.

The wired transmission path interface part 25 is an interface part for an interoffice transmission path between the radio base station apparatus 12 and the radio control part 13, and performs transmission and reception of communication signals to and from the radio control part 13.

The radio base station control part 26 performs transmission and reception of control signals to and from the radio control part 13, and performs radio link management, release of setting of radio link, etc.

Next, detailed configuration and operation of the interference canceler within the radio base station apparatus 12 will be described referring to the drawings.

Figure 3:
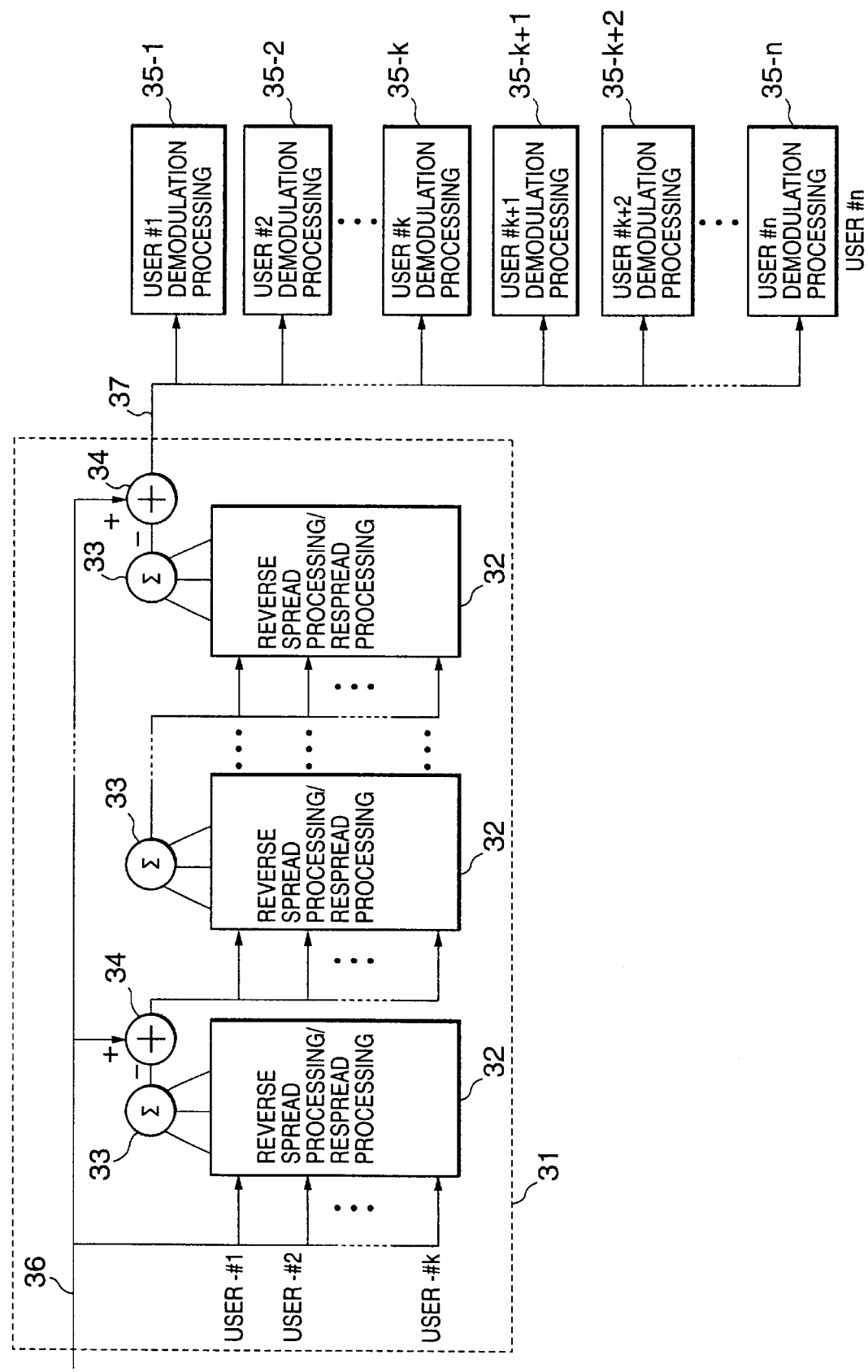
FIG. 3 is a block diagram showing an example of configuration of an interference canceler part as one function of a receiving part within a baseband signal processing part.

FIG. 3 is a block diagram showing an example of configuration of an interference canceler part as one function of the receiving part within the baseband signal processing part. In FIG. 3, the reference numeral 31 refers to an interference cancel processing part, 32 to a reverse spread processing/respread processing part, 33 to a synthesizing processing part, 34 to a subtraction processing part, and 35-1–35-n to demodulation processing parts.

The interference canceler part comprises: an interference cancel processing part 31 for performing interference cancel processing on a multi-wave signal into which a plurality of received spread spectrum signals are synthesized; and a plurality of demodulation processing parts 35 corresponding to users for performing demodulation processing such as correlating detection and synchronous detection on the signal subjected to the interference cancellation.

The interference cancel processing part 31 comprises: reverse spread processing/respread processing parts 32 for performing reverse spread processing and respread processing on received signals 36; synthesizing processing parts 33 for synthesizing signals subjected to the respread processing; and subtraction processing parts 34 for subtracting the synthesized signal from received signal. These processing parts are connected in a plurality of stages so as to repeat processing in the plurality of stages. With respect to the received signals 36, the interference cancel processing part 31 can process received signals of users #1–#k. On the other hand, the demodulation processing part is provided with n demodulation processing parts 35-1–35-n so that it can perform the demodulation processing of the received signals of user #1–#n, n being larger than the number of users that can be processed by the interference cancel processing part 31. Thus, the demodulation processing part performs the demodulation processing on the signals 37 that have been subjected to the interference cancel processing.

As described, in the embodiment of the present invention, the interference canceler unit is constructed such that the number of users that can be subjected to the demodulation processing by the demodulation processing parts 35 is larger than the number of users that can be subjected to the signal processing by the interference cancel processing part 31. Thus, owing to such construction in which demodulation processing is only performed for signals that have been subjected to the interference cancel processing with respect to a part of user signals, it is possible to moderate increase of the apparatus scale of the interference canceler unit when the number of received users increases.

Figure 4:
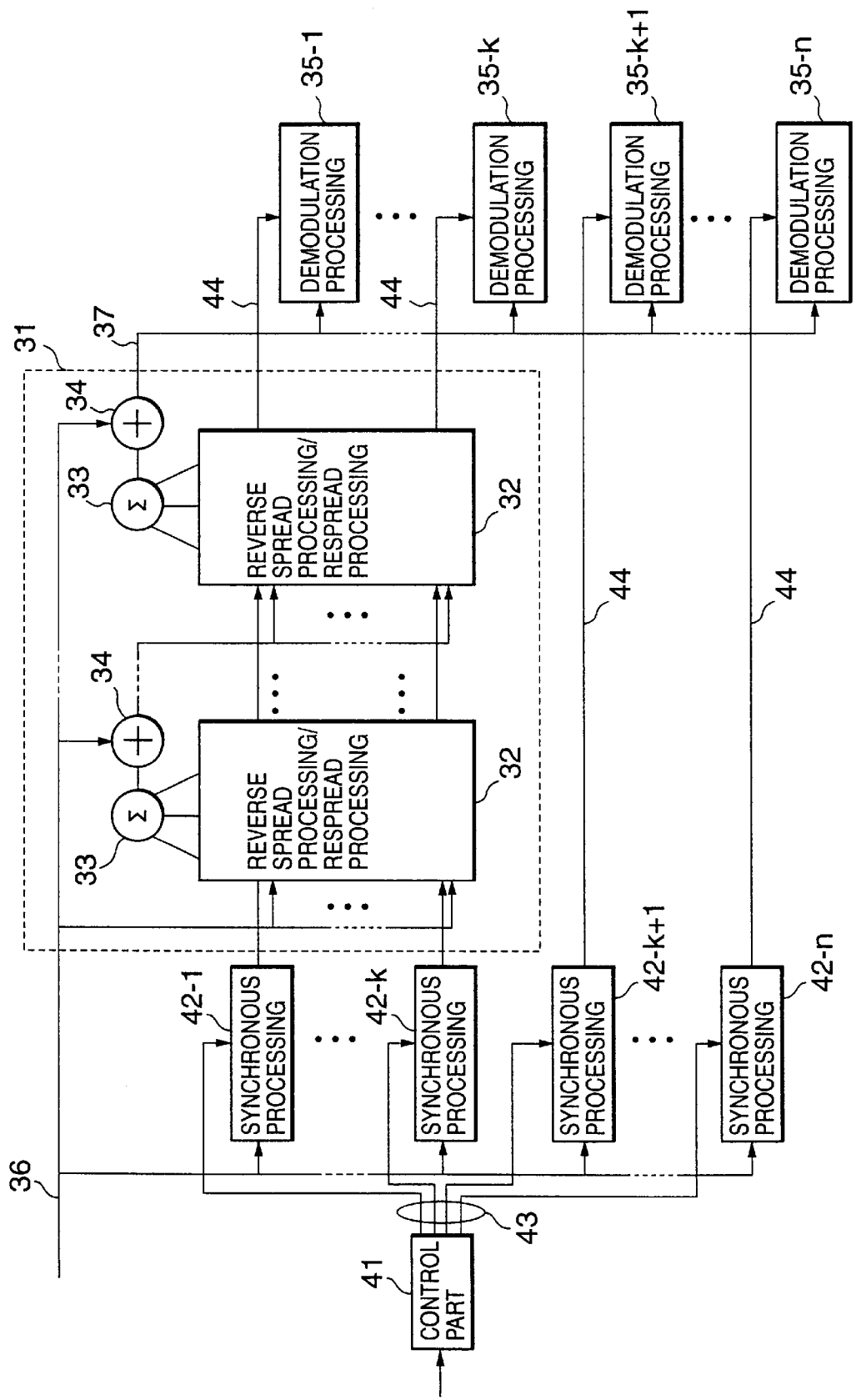
FIG. 4 is a block diagram showing another configuration example of the interference canceler part as one function of the receiving part within the baseband signal processing part.

FIG. 4 is a block diagram showing another configuration example of the interference canceler part as one function of the receiving part within the baseband signal processing part. In FIG. 4, the reference numerals 42-1–42-n refer to synchronous processing parts, and other symbols are same as in FIG. 3. In the following, referring to FIG. 4, a method of reception synchronization processing in the interference canceler part for each received signal will be described.

The interference canceler part shown in FIG. 4 is constructed such that the synchronous processing parts 42-1–42-n for performing reception synchronous processing of received signals are provided in the first input stage to the interference cancel processing part 31. These synchronous processing parts is controlled by control signals 43 from the control part 26. The synchronous processing parts 42-1–42-n, which are provided in the first input stage for performing reception synchronous processing of received user signals, performs reception synchronous processing both for the user signals on which the interference cancel processing is performed and for the user signals on which the interference cancel processing is not performed.

User signal selection processing performed for each of the synchronous processing parts 42-1–42-n is carried out based on an instruction by a control signal 43 from the control part 26 that allots user signals on which signal processing is performed. Thus, reception processing is started for a user signal designated in the received signals 36. The control signal 43 notified from the control part 26 includes information required for starting reception processing of the received signals 36 (information such as spread ratio, initial value of short code, initial value in of long code, reception timing, etc.). The control part 26 performs judgment processing to judge which synchronous processing part should start reception processing. Owing to the reception synchronous processing by the synchronous processing part 42, spread codes and timing of the spread codes of the received signals are obtained, and those pieces of information are transmitted to the demodulation processing parts 35 as signals 44 indicating information of a result of the synchronous processing.

Control signals 43 notified from the control part 26 start reception processing. With respect to user signals for which it is instructed to perform the interference cancel processing after reception synchronous processing, the interference cancel processing is carried out. With respect to user signals for which it is instructed not to perform the interference cancel processing, only the signals 44 indicating information of the result of the synchronous processing after the reception synchronous processing are transmitted to the demodulation processing parts 35. Thereafter, with respect to the signals that have been subjected to the interference cancel processing, the demodulation processing parts 35-1–35-n perform demodulation processing for all the received signals based on the signals 44 indicating the result of the synchronous processing.

Figure 5:
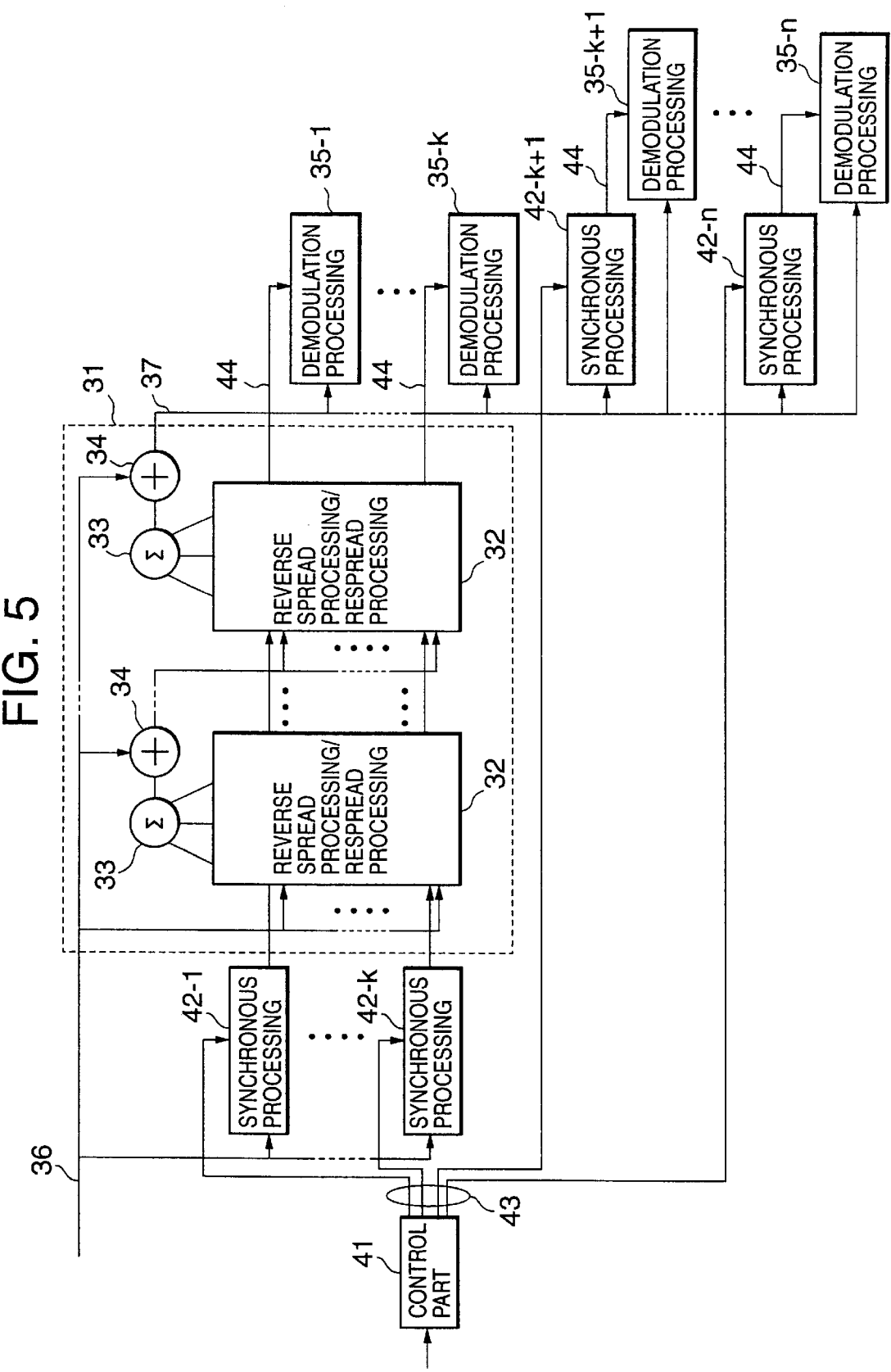
FIG. 5 is a block diagram showing still another configuration example of the interference canceler part as one function of the receiving part within the baseband signal processing part.

FIG. 5 is a block diagram showing still another configuration example of the interference canceler part as one function of the receiving part within the baseband signal processing part. The reference symbols in FIG. 5 are same as in FIGS. 3 and 4. In the following, referring to FIG. 5, another example of reception synchronous processing method for each received signal of the interference canceler part will be described.

The interference canceler part shown in FIG. 5 is constructed such that, in the example described referring to FIG. 4, out of the synchronous processing parts 42-1–42-n provided in the first input stage for performing the reception synchronous processing for the received signals, the synchronous processing parts 42-(k+1)–42-n corresponding to the user signals for which the interference cancel processing is not performed in the interference cancel processing part 31 are provided in the subsequent stage for performing synchronous processing on the signals 37 that have been subjected to the interference cancel processing, and the synchronous processing parts 42-1–42-k corresponding to the user signals for which the interference cancel processing is performed in the interference cancel processing part 31 are provided in the first input stage similarly to the configuration of FIG. 4.

According to this configuration, the synchronous processing, in which received user signals are subjected to reception synchronous processing, is performed in the synchronous processing parts 42-1–42-k provided in the first input stage with respect to the signals for which the interference cancel is performed. On the other hand, with respect to the signals for which the interference cancel is not performed, the synchronous processing is performed in the synchronous processing parts 42-(k+1)–42-n for the signals 37 that has been subjected to the interference cancel processing.

User signal selection processing performed for each of the synchronous processing parts 42-1–42-n is carried out based on an instruction by a control signal 43 from the control part 26 that allots the user signals on which signal processing is performed. With respect to user signals for which it is instructed to perform the interference cancel processing by the control signal 43 notified from the control part 26, those signals themselves are subjected to the interference cancel processing in the interference cancel processing part 31 and the demodulation processing in the demodulation processing parts 35-1–35-k. With respect to user signals for which it is instructed not to perform the interference cancel processing, signals 37 that have been subjected to the interference cancel processing are subjected to the reception synchronous processing by the synchronous processing parts 42-(k+1)–42-n, and thereafter to the demodulation processing by the demodulation processing parts 35-(k+1)–35-n.

Figure 6:
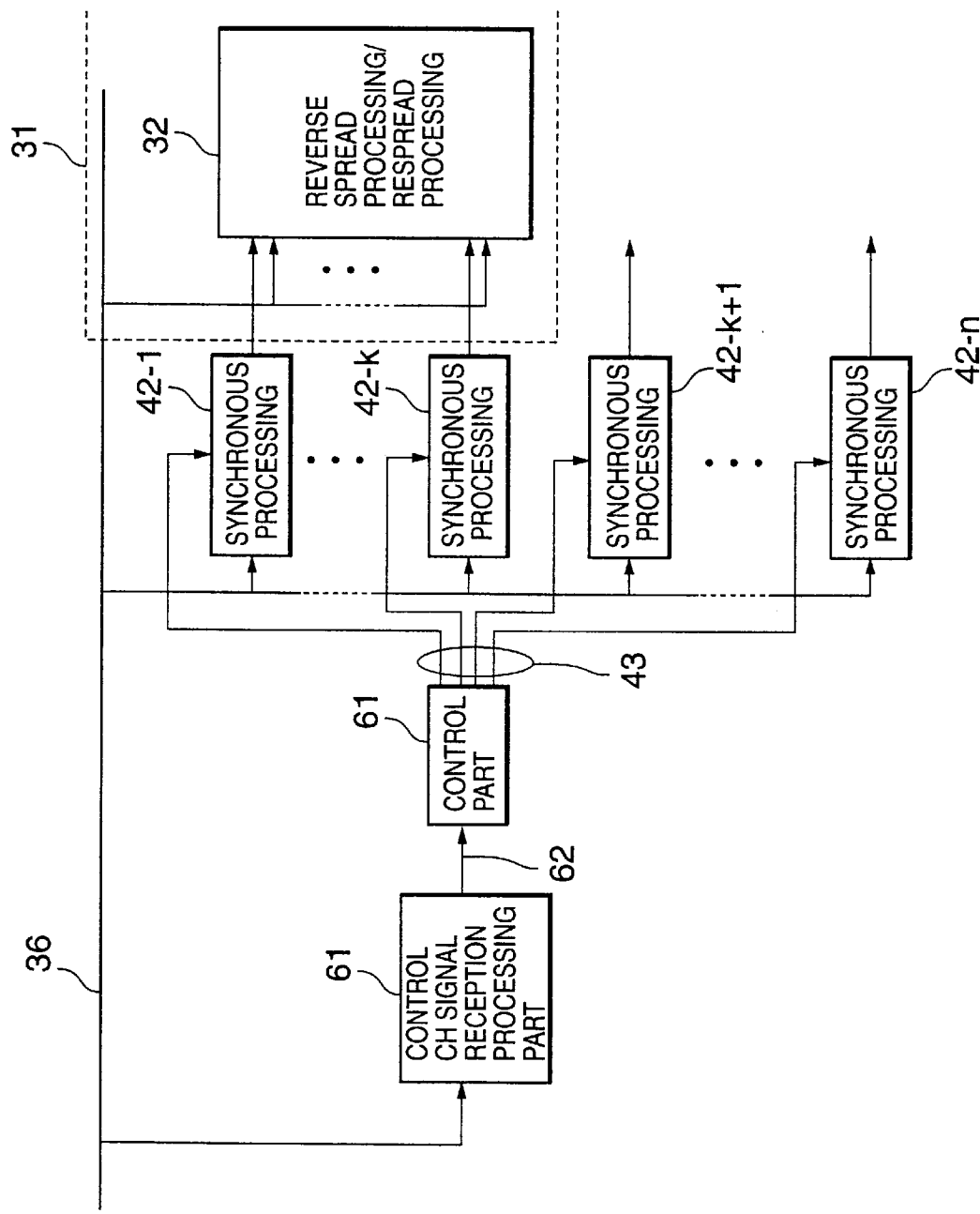
FIG. 6 is a diagram for explaining control for allotting user signals to or not to perform the interference cancel processing in the interference canceler part.

FIG. 6 is a diagram for explaining control for allotting user signals to or not to perform the interference cancel processing in the interference canceler part. In FIG. 6, the reference numeral 61 refers to a control channel (CH) signal reception processing part, and other symbols are same as in FIG. 4. In the example shown in FIG. 6, the interference canceler part shown in FIG. 4 performs allotting of the user signals to or not to perform the interference cancel processing based on information delivered from the control CH signal reception processing part 61.

Namely, in the example shown in FIG. 6, the interference canceler part's processing of allotting the user signals is performed by the control CH signal reception processing part 61 and the control part 26. The control CH signal reception processing part 61 performs demodulation processing of a control channel communication signal, and the like, that are carried out at the time of registering a position of a radio mobile station apparatus or at the time of starting to speak, and information on the control channel communication signal obtained in those operations is delivered as control CH information 62 to the control part 26. Based on the control CH information 62 notified, the control part 26 judges if each user signal is a signal on which the interference cancel processing is to be performed or not.

As one criterion of judging if the interference cancel processing is to be performed or not, may be used spread ratio information on a radio mobile station apparatus that is carrying out communication, the information being obtained from the control CH information 62. Generally, voice communication has a higher reverse spread gain than data communication. When power control of a received signal is carried out with a same SIR (signal to interference power ratio), received power of communication signal is smaller in voice communication than data communication. Conversely, data communication requires higher transmission power and interference with other communication signals becomes larger. Accordingly, the control part 26 performs the judgment processing such that the interference cancel processing is performed for a user signal of a radio mobile station apparatus that is judged to be performing data communication, and the interference cancel processing is not performed for a user signal of a radio mobile station apparatus that is judged to be performing voice communication. Then, the allotment processing of the user signals is performed based on the mentioned judgment. Thus, the control part 26 performs the above-described judgment processing on the received signals 36, and, with respect to signals that are judged as signals that are to be subjected to the interference cancel processing, delivers information on the received signals to the synchronous processing parts 42-1–42-k, as the control signals 43 to make them start the reception processing of the signals. On the other hand, with respect to signals that are judged as signals that are not to be subjected to the interference cancel processing, the control part 26 delivers information on the received signals to the synchronous processing parts 42-(k+1)–42-n, as the control signals 43 to make them start the reception processing.

Figure 7:
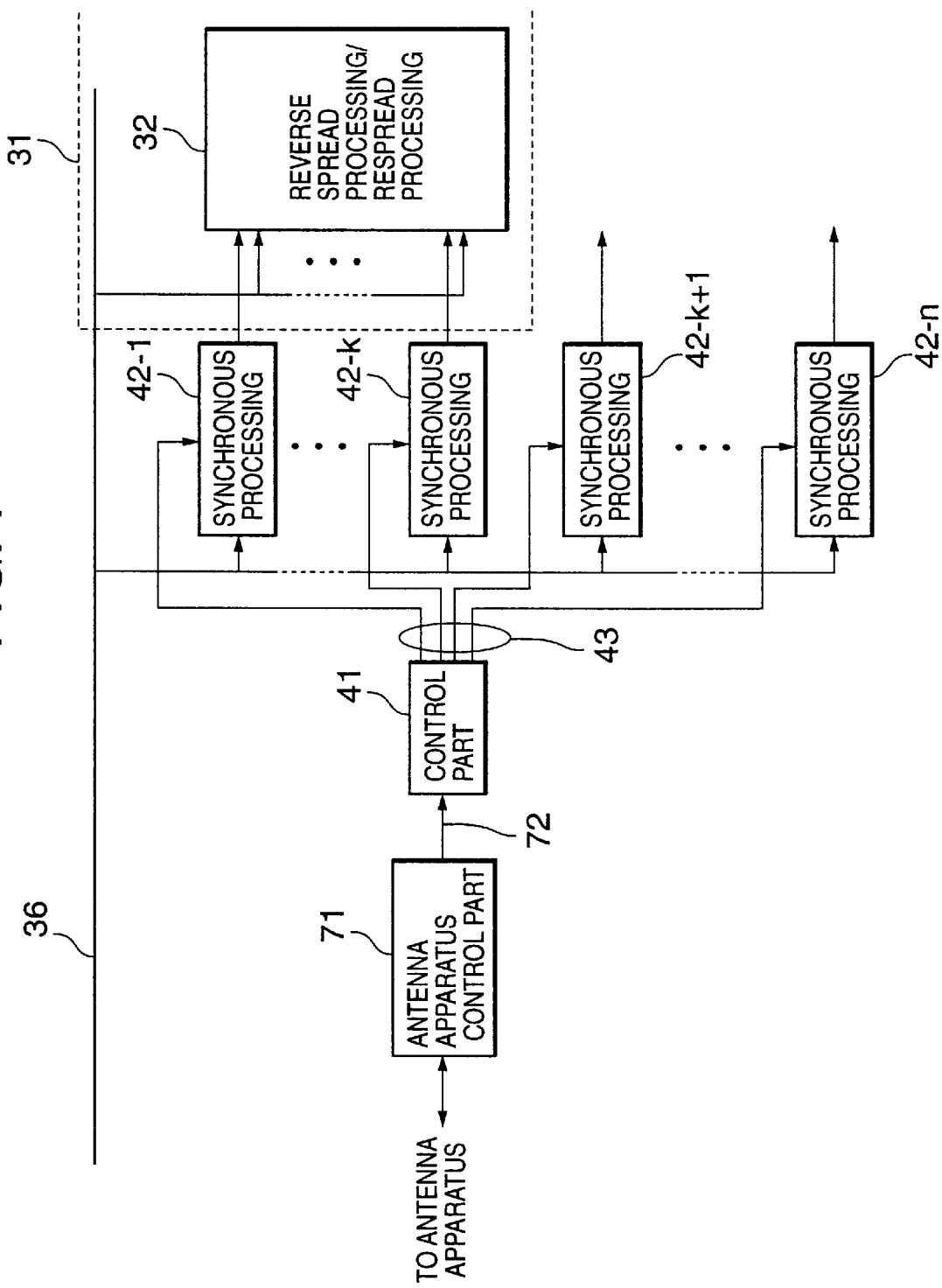
FIG. 7 is a diagram for explaining control by another method of allotting user signals to or not to perform the interference cancel processing in the interference canceler part.
Figure 8:
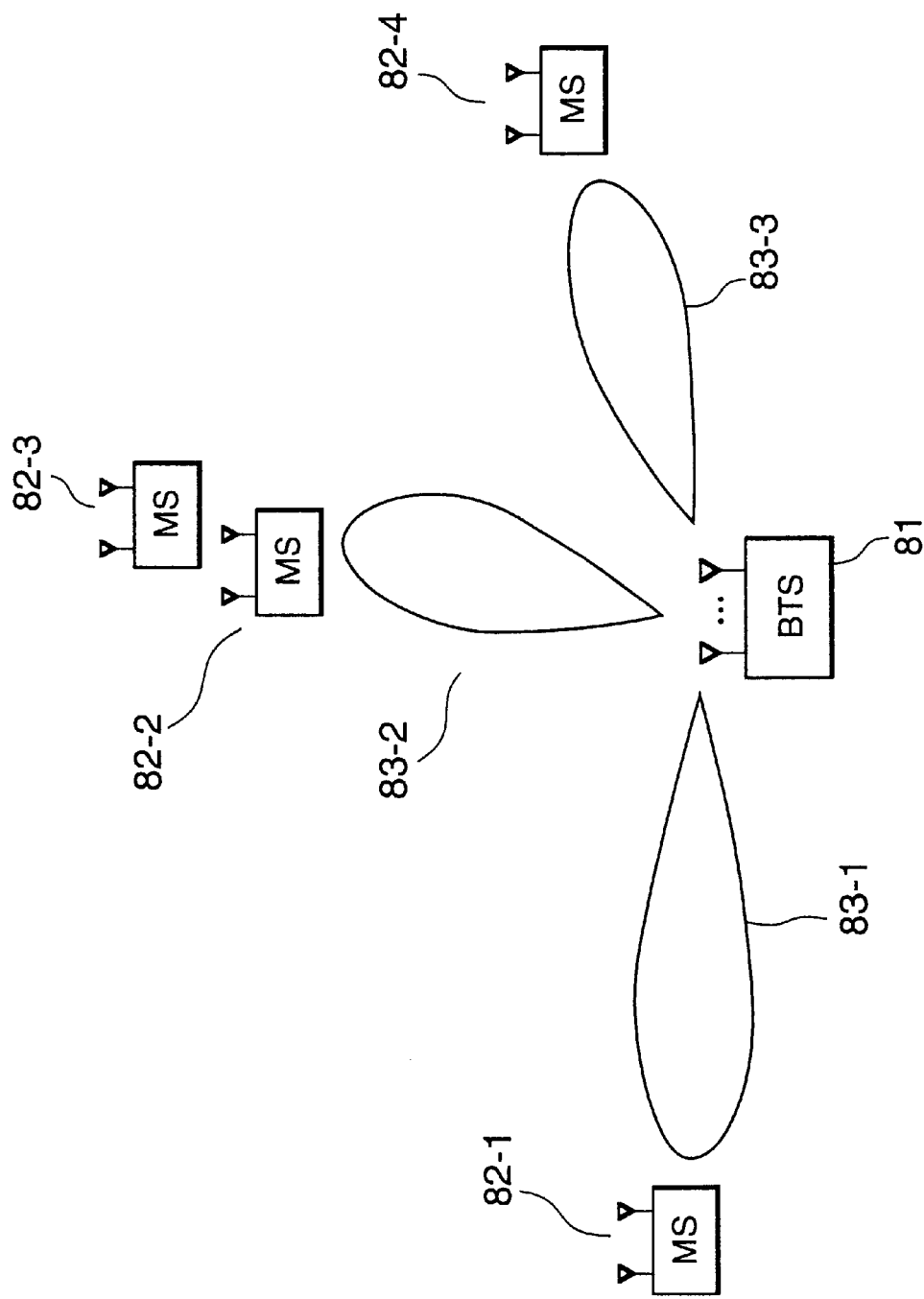
FIG. 8 is a diagram for explaining one of criteria used in FIG. 7 for judging if the interference cancel processing is to be performed or not.

FIG. 7 is a diagram for explaining control by another method of allotting user signals to or not to perform the interference cancel processing in the interference canceler part, and FIG. 8 is a diagram for explaining one of criteria used in FIG. 7 for judging if the interference cancel processing is to be performed or not. In FIGS. 7 and 8, the reference numeral 71 refers to an antenna apparatus control part, 11-1–11-4 to mobile station apparatuses, and 83-1–83-3 to antenna beams, and other symbols are same as in FIGS. 1 and 4. In the example described here, based on information from the antenna apparatus control part 71, the interference canceler part shown in FIG. 4 allots user signals to or not to perform the interference cancel processing. Namely, in the example shown in FIG. 7, allotment of the user signals to the interference canceler part is performed by the antenna apparatus control part 71 and the control part 26. Generally, in the case of an antenna apparatus that selects received signals by using antenna directivity and antenna gain that are dynamically changed by control, such as a smart antenna and array antenna, it controls antenna directivity and antenna gain to realize selection of user signals as targets of the reception processing and user signals that are not the targets. The antenna apparatus control part 71 is a control part that controls the mentioned antenna directivity and antenna gain. The antenna apparatus control part 71 notifies the control part 26 of antenna apparatus control information 72 on each radio mobile station apparatus after the control of the antenna apparatus. The control part 26 uses the antenna apparatus control information 72 to perform the judgment processing with respect to signals that are to be subjected to the interference cancel processing and signals that are not to be subjected to the interference cancel processing.

In that case, one of criteria for judging if the interference cancel processing is to be performed or not will be described referring to FIG. 8.

As shown in FIG. 8, radio mobile station apparatuses 82-1–82-4 are effectuating communication with a radio base station apparatus 81 using the code division multiple access method. Each communication is divisionally selected by control of antenna directivity and antenna gain of the antenna apparatus. The radio mobile station apparatus 82-1 and the radio mobile station apparatus 82-4 are different from each other in their directions from the radio base station apparatus 81, and accordingly, division and selection of communication between those radio mobile station apparatuses are performed by the antenna beams 83-1 and 83-3 having respective directivities and gains. Accordingly, with respect to those radio mobile station apparatuses, antenna gains are lowered for user signals out of the target, and thus, cross-correlation interference noise components by the other communication signals are suppressed. However, the radio mobile station apparatus 82-2 and the radio mobile station apparatus 82-3 are same in their direction from the radio base station apparatus 81, and accordingly, the antenna beam 83-2 having directivity and gain can not divide respective communications. Accordingly, with respect to these radio mobile station apparatus, the received demodulation signal includes a cross-correlation interference noise component by the other communication signal.

The antenna apparatus control part 71 delivers control information on each radio mobile station apparatus after the above-described control of the antenna apparatus to the control part 26, as antenna apparatus control information 72. Based on the notified antenna apparatus control information 72, the control part 26 performs the judgment processing with respect to signals for which the interference cancel processing is to be carried out and signals for which the interference cancel processing is not to be carried out. Thus, the control part 26 performs the above-mentioned judgment processing on the received signals 36, and, with respect to signals that are judged as signals that are to be subjected to the interference cancel processing, delivers information on the received signals to the synchronous processing parts 42-1–42-k, as the control signals 43 to make them start the reception processing of the signals. On the other hand, with respect to signals that are judged as signals that are not to be subjected to the interference cancel processing, the control part 26 delivers information on the received signals to the synchronous processing parts 42-(k+1)–42-n, as the control signals 43 to make them start the reception processing.

Figure 9:
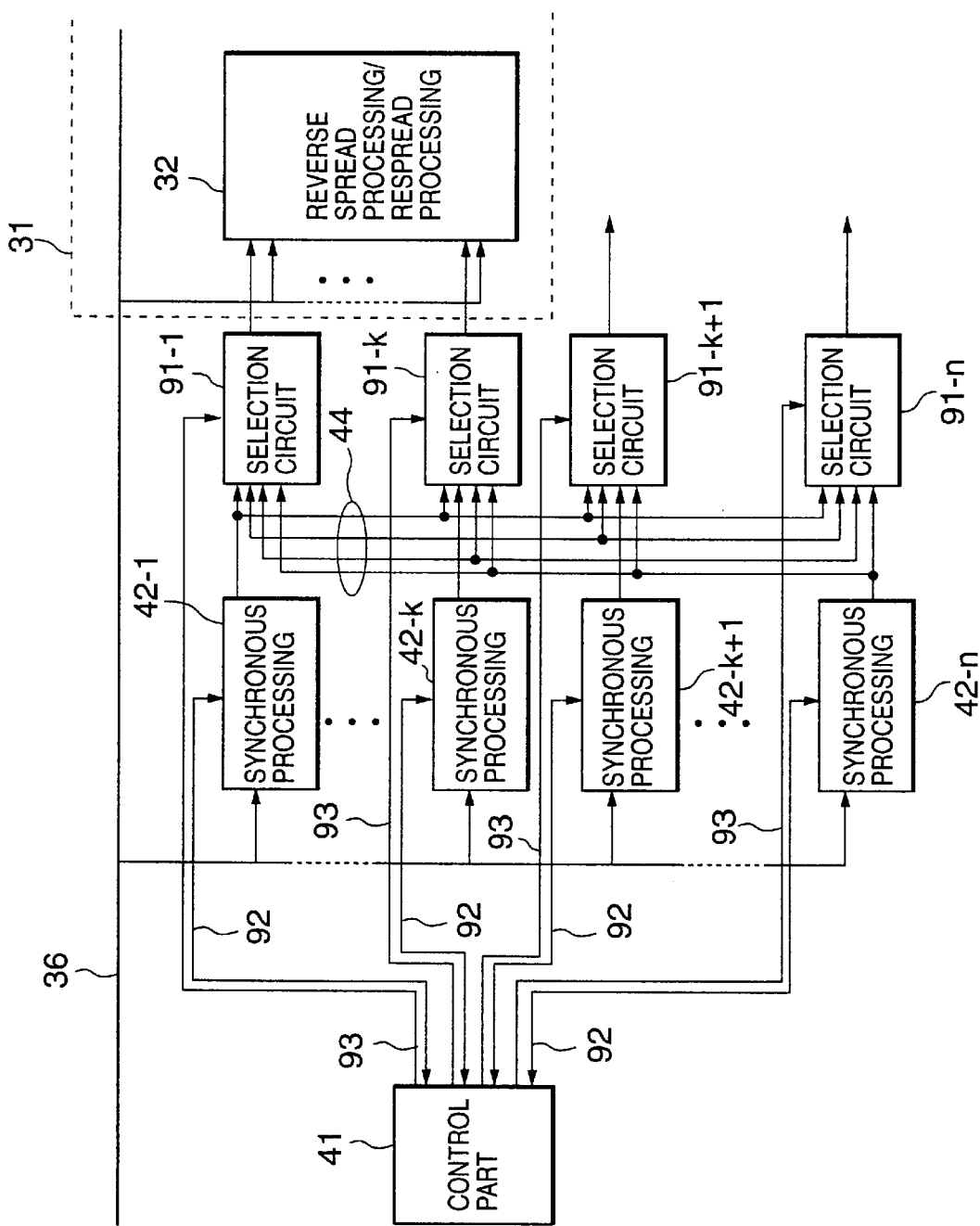
FIG. 9 is a diagram for explaining control by still another method of allotting user signals to or not to perform the interference cancel processing in the interference canceler part.

FIG. 9 is a diagram for explaining control by still another method of allotting user signals to or not to perform the interference cancel processing in the interference canceler part. In FIG. 9, the reference numerals 91-1–91-n refer to signal selection circuits, and the other symbols are same as in FIG. 4. In the example described here, the interference canceler part shown in FIG. 4 uses a result of path detection by the synchronous processing parts to allot user signals to or not to perform the interference cancel processing.

Namely, in the example shown in FIG. 9, allotment of the user signals in the interference canceler part is performed by the control part 26, the synchronous processing parts 42-1–42-n and the signal selection circuits 91-1–91-n. With respect to the received signals 36, the synchronous processing parts 42 perform synchronous processing and path detection processing for each received signal, and, in the path detection processing, performs measurement of delay profiles due to convolution processing of the received signals 36, to detect a plurality of paths received in a RAKE synthesis part. The control part 26 uses this result of path detection for each of the received signals to perform judgment processing with respect to signals that are to be subjected to the interference cancel processing and signals that are not to be subjected to the interference cancel processing.

Next, one of criteria used in the example of FIG. 9 for judging if the interference cancel processing is to be used or not will be described.

With respect to the user signals that the control part 26 has fixedly or dynamically judged and allotted, results of allotting judgment are delivered as information on the received signals to the synchronous processing parts 42-1–42-n by synchronous processing part control signals 92, to start reception processing. The synchronous processing parts 42-1–42-n, which have received reception start instructions through the synchronous processing part control signals 92 from the control part 26, perform synchronous processing and path detection processing, and results of the path detection processing are returned to the control part 26 as synchronous processing part control signals 92. Based on the path detection results of respective communication signals returned as the synchronous processing part control signals 92, the control part 26 performs judgment processing with respect to average peak power, in order to judge if a signal is one that is to be subjected to the interference cancel processing or one that is not to be subjected to the interference cancel processing, depending on the magnitude of the average peak power.

As one of the criteria for judging if the interference cancel processing is to be performed or not, may be mentioned a criterion that distinguishes the case that an average peak power is extremely larger or smaller than the target SIR from the other case. Namely, with respect to a communication signal of, for example, a radio mobile station apparatus close to the radio base station apparatus, which has a large average peak power and seems to interfere with another received signal, power control is performed to lower the transmission power since the interference cancel processing can improve the SIR value. As a result, an interference component in the other communication signals can be lowered. Also, with respect to a communication signal of, for example, a radio mobile station apparatus distant from the radio base station apparatus, which has a small average peak power, judgment processing is carried out so as to perform the interference cancel processing, and processing for suppressing a cross-correlation interference component included in the received signal is performed to increase the SIR value.

Thus, with respect to signals for which the control part 26 has judged that the interference cancel processing is to be performed, results 44 of the synchronous processing on the received signals are transmitted to the interference cancel processing part through the signal selection circuits 91-1–91-k to perform the interference cancel processing. With respect to signals for which it is judged that the interference cancel processing is not to be performed, the results 44 of the synchronous processing on the signals that are not to be subjected to the interference cancel processing are transmitted to the demodulation processing parts through the signal selection circuits 91-(k+1)–91-n to perform the demodulation processing.

Figure 10:
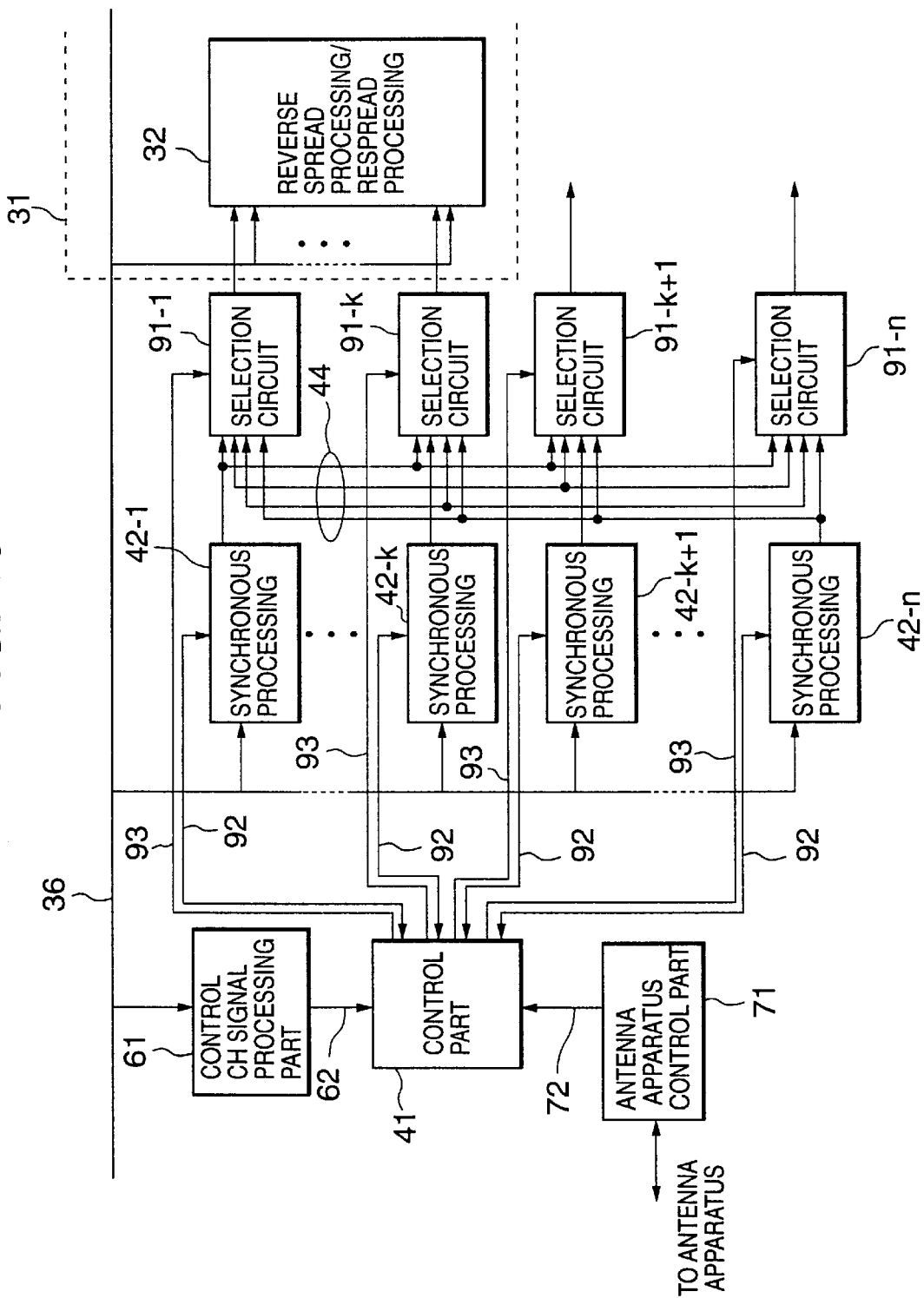
FIG. 10 is a diagram for explaining control by still another method of allotting user signals to or not to perform the interference cancel processing in the interference canceler part.

FIG. 10 is a diagram for explaining control by still another method of allotting user signals to or not to perform the interference cancel processing in the interference canceler part. The symbols used in FIG. 10 are same as in FIGS. 6–9. The example shown in FIG. 10 is obtained by combining the three examples of control of user signal allotment described hereinbefore referring to FIGS. 6–9.

Namely, the example of FIG. 10 is constructed such that processing of allotting user signals to the interference canceler part is carried out by the control CH signal reception processing part 61, the antenna apparatus control part 71, the control part 26, the synchronous processing parts 42-1–42-n, and the signal selection circuits 91-1–91-n. As already described, the control CH signal reception processing part 61 performs demodulation processing of a control channel communication signal, and the like, that are carried out at the time of registering a position of a radio mobile station apparatus or at the time of starting to speak, and information on the control channel communication signal obtained in those operations is delivered as control CH information 62 to the control part 26. Further, the antenna apparatus control part 71 performs control of an antenna apparatus that selects received signals by using antenna directivity and antenna gain that are dynamically changed by control, such as a smart antenna and array antenna. The antenna apparatus control part 71 notifies the control part 26 of the information on each radio mobile station apparatus after the mentioned control of the antenna apparatus, as the antenna apparatus control information 72.

Based on the above-mentioned information on the control channel communication signal and information on each radio mobile station apparatus after the control of the antenna apparatus, the control part 26 performs first judgment processing with respect to allotment into signals that are to be subjected to the interference cancel processing and into signals that are not to be subjected to the interference cancel processing. The results of the judgment on the allotment are notified by synchronous processing part control signals 92 to the synchronous processing part 42-1–42-n as information on the received signals, to make them start the reception processing.

With respect to the received signals 36 the synchronous processing parts 42-1–42-n perform the synchronous processing and path detection processing on each received signal, measures delay profiles due to convolution processing on the received signals 36 in the path detection processing, to detect a plurality of paths received in the RAKE synthesis part. The results of the path detection are returned to the control part 26 as synchronous processing part control signals 92. Based on the path detection results of respective communication signals returned as the synchronous processing part control signals 92, the control part 26 performs judgment processing with respect to average peak power. Then, the control part 26 rejudges if a signal is one that is to be subjected to the interference cancel processing or one that is not to be subjected to the interference cancel processing, depending of the magnitude of the average peak power, and, base on this rejudgment, performs switching processing with respect to the results of the first judgment. As the criterion of judging if the interference cancel processing is to be performed or not, may be employed the criterion that distinguishes the case that an average peak power is extremely larger or smaller than the target SIR from the other case, as described above.

Thus, with respect to signals for which the control part 26 has rejudged that the interference cancel processing is to be performed, the results 44 of synchronous processing on the received signals are transmitted to the interference cancel processing part through the signal selection circuits 91-1–91-k to perform the interference cancel processing. With respect to signals for which it is judged that the interference cancel processing is not to be performed, the results 44 of the synchronous processing on the signals that are not to be subjected to the interference cancel processing are transmitted to the demodulation processing parts through the signal selection circuits 91-(k+1)–91-n to perform the demodulation processing.

The three methods of allotting user signals to or not to perform the interference cancel processing, which have been described referring to FIGS. 6–10, may be applied to the example described referring to FIG. 5. Further, these three methods may be employed not individually but in combination of them.

As described above, in a radio base station apparatus that effectuates communication with a plurality of radio mobile station apparatuses in a mobile communication system using the code division multiple access method, the conventional technique has a problem that the interference cancel part, which is employed for preventing decrease of channel efficiency caused by cross-correlation interference due to increase of the number of communicating users, becomes larger in its apparatus scale as the number of the users admitted to the radio base station apparatus becomes larger. According to the above-described embodiments of the present invention, the mentioned problem can be solved by the interference cancel part constructed such that the interference cancel processing is performed not for all the received signals but for a part of the received signals, and by selecting received signals that are to be subjected to the interference cancel processing. Further, according to the embodiments of the present invention, the interference cancel processing and demodulation processing can be performed efficiently.

Using thus-described embodiments of the present invention, it is possible to provide a mobile communication system and a radio base station apparatus that can moderate increase of the apparatus scale of the interference canceler part accompanying increase of the number of users admitted to the radio base station apparatus, and can cut down the apparatus scale and costs of the radio base station apparatus while preventing decrease of the channel efficiency and effectuating high quality communication.

What is claimed is:

1. A mobile communication system having a radio base station apparatus that effectuates communication with radio mobile station apparatuses, wherein:

said radio base station apparatus comprises:
a signal processing means that receives a multi-wave signal as an input signal, into which spectrum spread codes from a plurality of radio mobile station apparatuses are synthesized, and that performs suppression processing for suppressing interference noise components other than a desired wave in demodulation of a target signal; and a demodulation processing means for performing demodulation processing on spread signals that have been subjected to the suppression processing with respect to the interference noise components; and a number of user signals on which said signal processing means can perform signal processing is smaller than a number of user signals that have been subjected to said suppression processing for suppressing the noise components and that can be demodulated by said demodulation processing means.

2. The mobile communication system according to claim 1, wherein:

said signal processing means that suppresses the interference noise components selects a part of the user signals, and uses said selected part of the user signals to suppress the interference noise components.

3. The mobile communication system according to claim 1, wherein:

said radio base station apparatus further comprises synchronous processing means that perform reception synchronous processing based on control information from a control part that gives a selection instruction with respect to each of received user signals for selecting user signals that are to be subjected to signal processing in said signal processing means;

all said synchronous processing means are positioned in an input stage for received signals;

the user signals that are to be subjected to the suppression processing for suppressing the interference noise components are subjected to the synchronous processing before said suppression processing; and results of the reception synchronous processing on user signals that are not to be subjected to the suppression processing for suppressing the interference noise components are transmitted to said demodulation processing means.

4. The mobile communication system according to claim 3, wherein:

said control part that gives the selection instruction with respect to the user signals selects said user signals that are to be subjected to said suppression processing for suppressing the interference noise components, based on a result of signal processing in a control channel signal processing part, or based on control information that is delivered from an antenna control part controlling an antenna part and that makes selection processing for the received signals possible.

5. The mobile communication system according to claim 3, wherein:

said radio base station apparatus further comprises a selection circuit for selecting user signals, between said synchronous processing means and said signal processing means that performs the suppression processing for suppressing the interference noise components; and said control part that gives the selection instruction for selecting said user signals receives a result of the synchronous processing in the synchronous processing means with respect to user signals according to the selection instruction, selects again user signals based on the result of the synchronous processing, and controls said selection circuit based on a result of said selection, to select again user signals that are to be subjected to the suppression processing for suppressing the interference noise components.

6. The mobile communication system according to claim 3, wherein:

said radio base station apparatus further comprises a selection circuit for selecting user signals, between said synchronous processing means and said signal processing means that performs the suppression processing for suppressing the interference noise components; and said control part that gives the selection instruction for selecting said user signals:

selects user signals that are to be subjected to the suppression processing for suppressing the interference noise components, based on information on signal processing in a control channel signal processing part and/or control information that is delivered from an antenna control part controlling an antenna part and that makes selection processing for the received signal possible;

receives the result of the synchronous processing in the synchronous processing means that performs synchronous processing with respect to user signals according to the selection instruction;

selects again user signals based on a result of said synchronous processing, and controls said selection circuit based on a result of said selection, to select again user signals that are to be subjected to the suppression processing for suppressing the interference noise components.

7. The mobile communication system according to claim 1, wherein:

said radio base station apparatus further comprises a plurality of synchronous processing means that perform reception synchronous processing based on control information from a control part that gives a selection instruction with respect to each of received user signals for selecting user signals that are to be subjected to signal processing in said signal processing means;

out of said plurality of synchronous processing means, synchronous processing means corresponding to the user signals that are to be subjected to the suppression processing for suppressing the interference noise components are positioned in an input stage for received signals;

synchronous processing means corresponding to user signals that are not to be subjected to the suppression processing for suppressing the interference noise components are positioned in a previous stage to said demodulation processing means after the suppression processing of the interference noise components;

the user signals that are to be subjected to the suppression processing for suppressing the interference noise components are subjected to the suppression processing after subjected to the synchronous processing; and said reception synchronous processing and said demodulation processing are carried out after a part of the user signals are subjected to the suppression processing for suppressing the interference noise components.

8. A radio base station apparatus in a mobile communication system, said radio base station apparatus effectuating communication with radio mobile station apparatuses, wherein:

said radio base station apparatus comprises:

a signal processing means that receives a multi-wave signal as an input signal, into which spectrum spread codes from a plurality of radio mobile station apparatuses are synthesized, and that performs suppression processing for suppressing interference noise components other than a desired wave in demodulation of a target signal; and a demodulation processing means for performing demodulation processing on spread signals that have been subjected to the suppression processing with respect to the interference noise components; and a number of user signals on which said signal processing means can perform signal processing is smaller than a number of user signals that have been subjected to said suppression processing for suppressing the noise components and that can be demodulated by said demodulation processing means.

9. The radio base station apparatus according to claim 8, wherein:

said signal processing means that suppresses the interference noise components selects a part of the user signals, and uses said selected part of the user signals to suppress the interference noise components.

10. The radio base station apparatus according to claim 8, wherein:

said radio base station apparatus further comprises synchronous processing means that perform reception synchronous processing based on control information from a control part that gives a selection instruction with respect to each of received user signals for selecting user signals that are to be subjected to signal processing in said signal processing means;

all said synchronous processing means are positioned in an input stage for received signals;

the user signals that are to be subjected to the suppression processing for suppressing the interference noise components are subjected to the synchronous processing before said suppression processing; and results of the reception synchronous processing on user signals that are not to be subjected to the suppression processing for suppressing the interference noise components are transmitted to said demodulation processing means.

11. The radio base station apparatus according to claim 10, wherein:

said control part that gives the selection instruction with respect to the user signals selects said user signals that are to be subjected to said suppression processing for suppressing the interference noise components, based on a result of signal processing in a control channel signal processing part, or based on control information that is delivered from an antenna control part controlling an antenna part and that makes selection processing for the received signals possible.

12. The radio base station apparatus according to claim 10, wherein:

said radio base station apparatus further comprises a selection circuit for selecting user signals, between said synchronous processing means and said signal processing means that performs the suppression processing for suppressing the interference noise components; and said control part that gives the selection instruction for selecting said user signals receives a result of the synchronous processing in the synchronous processing means with respect to user signals according to the selection instruction, selects again user signals based on the result of the synchronous processing, and controls said selection circuit based on a result of said selection, to select again user signals that are to be subjected to the suppression processing for suppressing the interference noise components.

13. The radio base station apparatus according to claim 10, wherein:

said radio base station apparatus further comprises a selection circuit for selecting user signals, between said synchronous processing means and said signal processing means that performs the suppression processing for suppressing the interference noise components; and said control part that gives the selection instruction for selecting said user signals:

selects user signals that are to be subjected to the suppression processing for suppressing the interference noise components, based on information on signal processing in a control channel signal processing part and/or control information that is delivered from an antenna control part controlling an antenna part and that makes selection processing for the received signal possible;

receives the result of the synchronous processing in the synchronous processing means that performs synchronous processing with respect to user signals according to the selection instruction;

selects again user signals based on a result of said synchronous processing, and controls said selection circuit based on a result of said selection, to select again user signals that are to be subjected to the suppression processing for suppressing the interference noise components.

14. The radio base station apparatus according to claim 8, wherein:

said radio base station apparatus further comprises a plurality of synchronous processing means that perform reception synchronous processing based on control information from a control part that gives a selection instruction with respect to each of received user signals for selecting user signals that are to be subjected to signal processing in said signal processing means;

out of said plurality of synchronous processing means, synchronous processing means corresponding to the user signals that are to be subjected to the suppression processing for suppressing the interference noise components are positioned in an input stage for received signals;

synchronous processing means corresponding to user signals that are not to be subjected to the suppression processing for suppressing the interference noise components are positioned in a previous stage to said demodulation processing means after the suppression processing of the interference noise components;

the user signals that are to be subjected to the suppression processing for suppressing the interference noise components are subjected to the suppression processing after subjected to the synchronous processing; and said reception synchronous processing and said demodulation processing are carried out after a part of the user signals are subjected to the suppression processing for suppressing the interference noise components.

* * * * *